United States Patent [19]

Teyssandier et al.

[11] Patent Number: 5,272,462
[45] Date of Patent: Dec. 21, 1993

[54] REMOTE TRANSMISSION DEVICE BY ON-LINE CARRIER CURRENTS DESIGNED FOR CONTROL AND MONITORING OF AN ELECTRICAL POWER DISTRIBUTION SYSTEM, NOTABLY MEDIUM VOLTAGE

[75] Inventors: Christian Teyssandier, Rives; Jean-Marc Verdier, Paris; André Perez, Mergenon, all of France

[73] Assignee: Merlin Gerin, France

[21] Appl. No.: 889,363

[22] Filed: May 28, 1992

[30] Foreign Application Priority Data

Jun. 3, 1991 [FR] France .................. 91 06982

[51] Int. Cl.⁵ .................. H04B 3/00; H04L 27/00
[52] U.S. Cl. .................. 340/310 R; 340/310 A; 340/310 CP
[58] Field of Search ....... 340/310 R, 310 A, 310 CD, 340/825.05, 825.22; 375/37

[56] References Cited

U.S. PATENT DOCUMENTS

| | | | |
|---|---|---|---|
| 4,302,750 | 11/1981 | Wadhwani et al. | 340/310 A |
| 4,596,982 | 6/1986 | Bahr et al. | 340/825.05 |
| 4,918,566 | 4/1990 | Brodsky et al. | 361/166 |

FOREIGN PATENT DOCUMENTS 0062870 10/1982 European Pat. Off. .
0064094 11/1982 European Pat. Off. .
2176972 1/1987 United Kingdom .

OTHER PUBLICATIONS

IEEE Transactions on Power Delivery, vol. 5, No. 1, Jan. 1990, "A Knowledge-Based Approach to Optimize Switching in Substations".

Primary Examiner—Donnie L. Crosland
Attorney, Agent, or Firm—Parkhurst, Wendel & Rossi

[57] ABSTRACT

A remote transmission device for the automation of an electrical power distribution system includes a pilot and slave mechanism of communication by on-line carrier currents using capacitive coupling of the lines of the power system as transmission support for the exchange of information and order to a plurality of breaking devices. Depending on the priority code of modems in the system, on the level of the received signal, and on the open or closed position of certain breaking devices, the transmission device breaks down automatically into several disunited subsystems, each containing a source substation to which a communication zone is assigned, whose boundaries in normal operating conditions are formed by open line switches. In emergency situations, the boundaries of the communication zones are modified by a coupling circuit which can be in a first by-pass state or in a second dual coupling state.

10 Claims, 5 Drawing Sheets

REMOTE TRANSMISSION DEVICE BY ON-LINE CARRIER CURRENTS DESIGNED FOR CONTROL AND MONITORING OF AN ELECTRICAL POWER DISTRIBUTION SYSTEM, NOTABLY MEDIUM VOLTAGE

BACKGROUND OF THE INVENTION

The invention relates to a remote transmission device designed for automation of an electrical power distribution system, notably medium voltage, comprising means of communication by on-line carrier currents using by capacitive coupling the lines of the power system as transmission support for exchange of information and orders between a computerized remote control system and a plurality of breaking devices, notably remote-controlled switches and circuit breakers located along a plurality of elementary sections of the power system to perform a modification in the structure of the power system affected by an incident, by means of opening and closing operations of the breaking devices involved, the power system being interconnected to source substations controlled by the computerized remote control system by means of specific connections.

To replace transmissions by radio or telephone, an on-line carrier current transmission system of this kind is envisageable to improve operation of medium voltage power distribution systems, notably for remote control, automation, examination, remote customer metering, order transmission and remote measuring applications. A modulation used is single-sideband amplitude modulation extending from 40 to 500 kHz.

The modification to the structure of the power distribution system resulting from the opening and closing operations of the circuit breakers or switches following faults or deliberate operator action can however disturb signal transmission with level weakening phenomena in some sections of the power system, which is detrimental to the reliability of the remote transmission system.

SUMMARY OF THE INVENTION

The object of the invention is to improve the remote transmission device by enabling continuity of communication of all the breaking devices following a fault on a line.

The remote transmission device is characterized in that:
the transmission device is broken down under normal operating conditions into several disunited sub-systems each containing a source substation, which has assigned to it a communication zone, whose boundaries are formed by line switches in the open state;
each source substation comprises a pilot means of communication having a master modulation and demodulation circuit designed to receive and send a coded signal within a predetermined communication zone;
each line switch is equipped with an auxiliary means of communication having a slave modulation and demodulation circuit designed to send and receive the coded signals with an order of priority, by means of a first receiver connected to a downline coupler connected to one of the terminals of said switch, a second receiver connected to an upline coupler connected to the opposite terminal of the same switch, and a transmitter connected to a coupling circuit;
said coupling circuit is either in a first shunt or by-pass state when the associated switch is closed, or on receipt of a single coded signal by the first or second receiver, or in a second dual coupling state, when the switch is open, and when two coded signals are received, so as to automatically reconfigure the communication zones on a faulty line, enabling optimum communication of the transmission device to be obtained before the structure of the power system is modified.

According to a feature of the invention, the coupling circuit of each auxiliary means of communication comprises a switching system with two contacts serially connected respectively to the output of each downline and upline coupler, and with a mid-point connected to the output of the transmitter, each contact being actuated by a relay controlled by an electronic circuit of the slave modulation and demodulation circuit.

A position detector sends the electronic circuit a signal indicating the open or closed state of the line switch.

The two relay contacts are closed in the first state where the coupling circuit is shunted, whereas in the second dual coupling state, one of said contacts is closed and the other is open, the closed contact being located on the side of the source substation sending the coded signal of higher priority, or of higher level.

The computerized remote control system cooperates with a management unit connected to the pilot means of communication of each source substation by connections to perform priority management between the applications and information routing to the pilot means of communication of the source substations involved.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
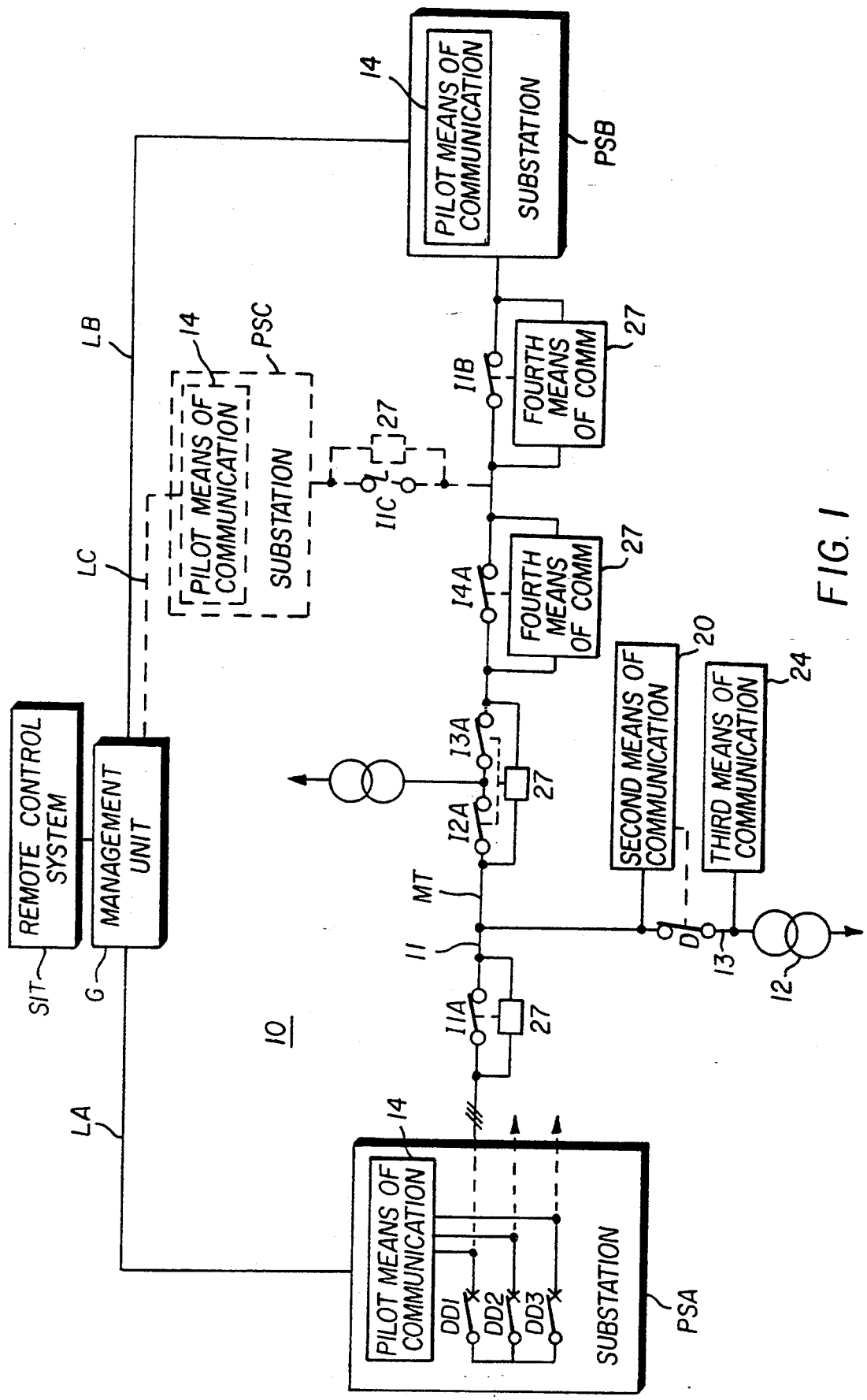
FIG. 1 shows the block diagram of a remote transmission device by on-line carrier currents according to the invention.

Referring to FIG. 1, a remote transmission device 10 by on-line carrier currents is associated with a medium voltage electrical power distribution system MT (between 15 kV and 33 kV), to perform a set of applications, notably remote control, automation and examination of the power system MT, remote customer metering, remote measuring, transmission of orders to customers, etc. The transmission device 10 uses the lines of the three-phase power system MT as transmission support and performs transportation of the information exchanged between a computerized remote control system SIT, and elementary breaking devices distributed over the power system MT, so as to be able to restructure in a predetermined time the whole of the power system MT affected by an incident.

Depending on their location in the power system MT, the breaking devices are formed either by remote-controlled switches I1A,I2A, I3A,I4A, ...I1B,I1C ... located along the main line 11, or by circuit breakers, one D of which is a reclosing circuit breaker of a branch line 13 for supply of a medium voltage/low voltage transformer substation 12.

The main line 11 of the power system MT is supplied by a plurality of source substations PSA,PSB,PSC,... constituting grouping points of overhead, underground or mixed feeders, supplied by high voltage/medium voltage transformers. Each source substation PSA,PSB,PSC comprises several feeder circuit breakers DD1,DD2,DD3, one DD1 of which, of source substation PSA, is connected to the main line 11. The other feeder circuit breakers of source substations PSB and PSC are not represented.

Operation of the transmission device 10 by on-line carrier currents does not disturb distribution of the 50 Hz electrical power of the system MT. The variability of the power system MT configuration, i.e. of the transmission support of the device 10, and the priorities between the applications require all the communications to be managed at the level of a management unit G, able to be controlled by the computerized remote control system SIT.

The management unit G also performs routing of the communications to the source substations PSA,PSB,PSC, ... by analyzing the content of the applications messages received by the SIT system. Depending on whether the switches I1A,I2A... of the main line 11 are in open or closed state, or whether a fault has occurred on the power system MT, the management unit G may take part in drawing up the communication zones of each source substation PSA,PSB,PSC ..., then sends control orders to the source substations involved according to the address involved.

Each source substation PSA,PSB,PSC contains a first pilot means of communication 14 connected to the power system MT downline from the feeder circuit breakers DD1,DD2,DD3, and electrically connected to the management unit G by a specific line LA,LB,LC, notably by radio transmission, by pilot wires or by telephone.

Figure 2:
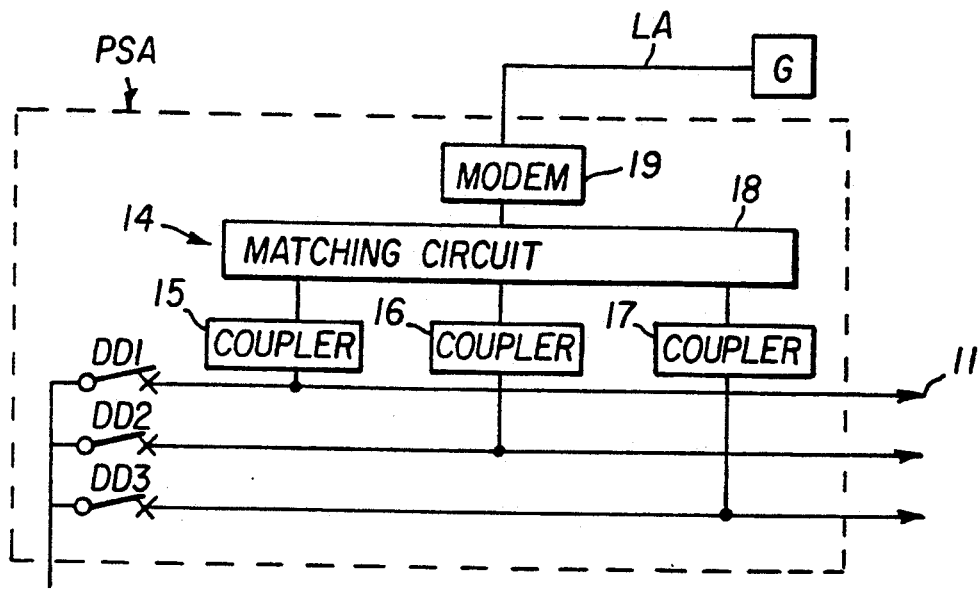
FIGS. 2 to 4 represent in schematic form the composition of a means of communication respectively of a source substation, of a reclosing circuit breaker of a branch line, and of a transformer substation.

FIG. 2 represents the composition of a pilot means of communication 14 of the source substation PSA assigned with the code A, comprising a coupler 15,16,17 per feeder, connected downline from the corresponding feeder circuit breaker DD1,DD2, DD3, to achieve coupling of the pilot means of communication 14 with the power system MT. A common matching circuit 18 is connected between the different couplers 15,16,17, and a modulation and demodulation circuit 19 hereafter called "modem". Access from the modem 19 to the management unit G is achieved via the line LA. The first pilot means of communication 14 is master in its communication zone, and the modem 19 only receives and sends on a single adjustable code.

Figure 3:
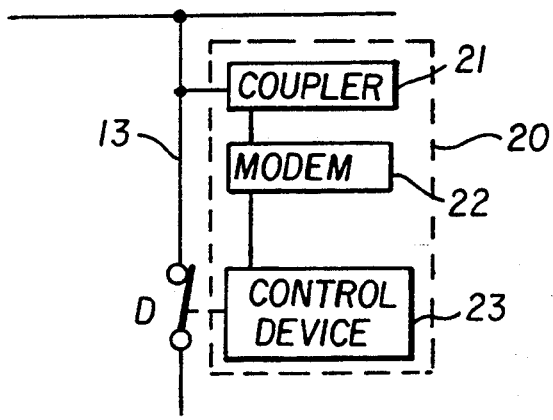

The circuit breaker D of the branch line 13 comprises a second means of communication 20 made up of a coupler 21 connected upline from the circuit breaker D, and a modem 22 connected to a control device 23 of the circuit breaker D (FIG. 3).

Figure 4:
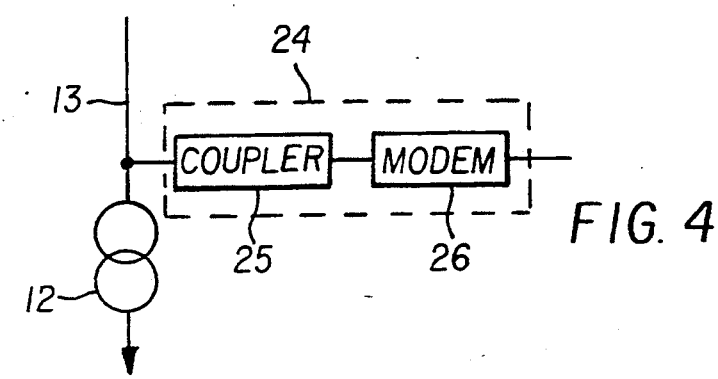

In FIG. 4, the medium voltage/low voltage transformer substation 12 located downline from the circuit breaker D comprises a third means of communication 24 made up of a coupler 25 connected upline from the substation 12, and a modem 26 with access either to a low voltage remote information concentrator, or to a power meter, or to a predetermined interface.

The second and third means of communication 20,24 with single connection can send and receive on several preselected codes. Switching from one code to the other takes place after a predetermined time.

Figure 5:
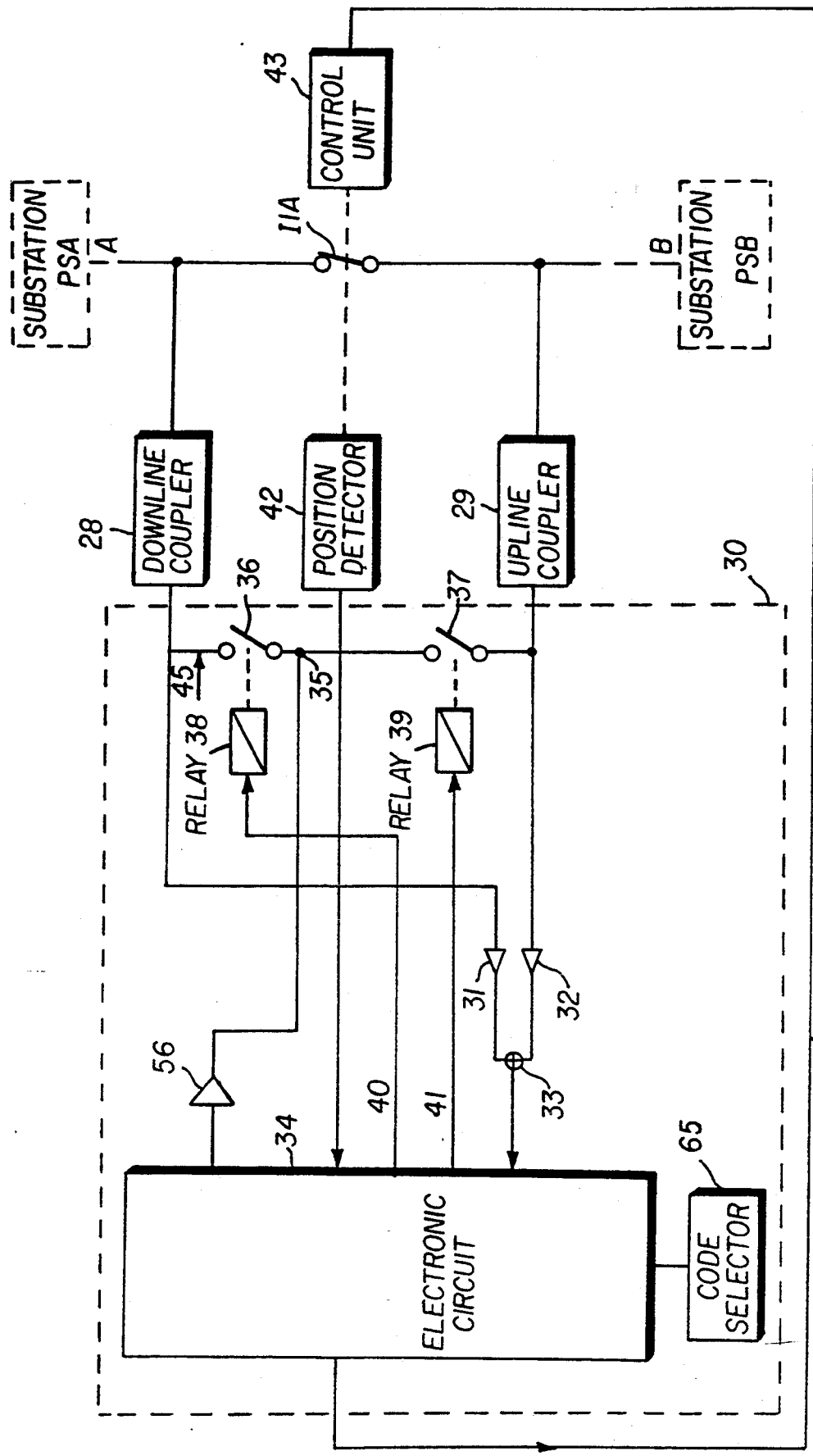
FIG. 5 is the wiring diagram of the auxiliary means of communication of a line switch.

Referring to FIG. 5, the switch I1A of the main line 11 is equipped with an auxiliary fourth means of communication 27 comprising a downline coupler 28 and an upline coupler 29 located on either side of the switch I1A to perform the by-pass function in the open state of the switch I1A.

The two line couplers 28,29 are electrically connected to a printed circuit board of a modem 30 designed to perform modulation suited to the transmission network, and possibly to interpret low-level information for communications management. The downline coupler 28 is connected to a first receiver 31, and the upline coupler 29 is connected to a second receiver 32. The outputs of the two receivers 31,32 are connected to a summing or switching circuit 33, whose output signal is applied to an electronic modulation/demodulation circuit 34, associated with a code selector 65. A transmitter 56 is controlled by the electronic circuit 34, and is connected to a mid-point 35 of a switching system having for example two auxiliary contacts 36,37 respectively connected to the output of the couplers 28,29. The two contacts 36,37 are actuated by relays 38,39 controlled from the electronic circuit 34 by two electrical connections 40,41. A position detector 42 sends the electronic circuit 34 a signal of the open or closed state of the main line switch I1A. Access to the control unit 43 of the switch I1A is from the electronic circuit 34 via an electrical connection 44.

According to an alternative embodiment, the summing circuit 33 can be eliminated, and the two outputs of the receivers 31,32 are controlled directly by the electronic circuit 34.

All the couplers 15,16,17,21,25,28,29 are of the capacitive type which allow the high-frequency coded signals from the transmission device 10 to pass, and block the 50 Hz signal of the power system MT.

The fourth means of communication 27 of the switch I1A can send and receive preselected codes with an order of priority. For the switch I1A in FIG. 5, the codes A,B and C are selected as an example with the respective priorities 1,2,3.

Connection of the fourth means of communication 27 is:

either on by-pass when the switch I1A is closed, or when the modem 30 receives nothing or a single code, for example A or B;

or double coupler when the switch I1A is open, and when the modem 30 receives two codes, for example A and B.

Operation of the fourth means of communication 27 according to FIG. 5 is as follows:

It is assumed that the fourth means of communication 27 of the switch I1A is in the communication zone A. The receiver 31 receives via the coupler 28, the code A from source substation A with priority 1, and the receiver 32 receives via the coupler 29 the code B from source substation B with priority 2.

BY-PASS COUPLING

In the event of a single code A or B being sent by the source substation PSA or PSB, the corresponding receiver 31 or 32 receives said code, and the electronic circuit 34 sends a closing signal to the two relays 38,39. The two contacts 36,37 of the coupling circuit 45 close so as to form a high-frequency shunting circuit called by-pass, connected to the respective output of each coupler 28,29.

In the absence of a signal being sent by the source substations PSA,PSB, the receivers 31,32 do not detect anything, and the electronic circuit 34 cooperates with the relays 38,39 to keep the contacts 36,37 closed.

In the closed state of the switch I1A, the associated position detector 42 sends a state signal to the electronic circuit 34, which keeps the by-pass contacts 36,37 closed.

DUAL COUPLING

Dual coupling of the fourth means of communication 27 takes place in the open state of the switch I1A, and on dual receipt of the codes A and B by the receivers 31,32. Two operating cases are possible:

When the level of the codes A and B is approximately the same, the electronic circuit 34 tries to communicate with code A of priority 1, causing via the relays 38,39 closing of the contact 36 and opening of the contact 37.

When the level of one of the codes is greatly different from the other code, for example code B greater than code A, the electronic circuit 34 then tries to communicate with the higher level code B, and causes opening of the contact 36 by the relay 38 and closing of the contact 37 by the relay 39.

The different means of communication 20,24,27 of the power system MT are completely transparent from the transported data content, i.e. transmission is only performed at the request of an application, without any modification.

The function of the management unit G consists in performing:

management of priorities between applications,
routing of information to the source substations PSA,PSB,PSC involved,
management of performances (error measurement) and malfunctions (monitoring),
and accessorily, management of time delays for change of communications zones of the transmission device 10.

Figure 6:
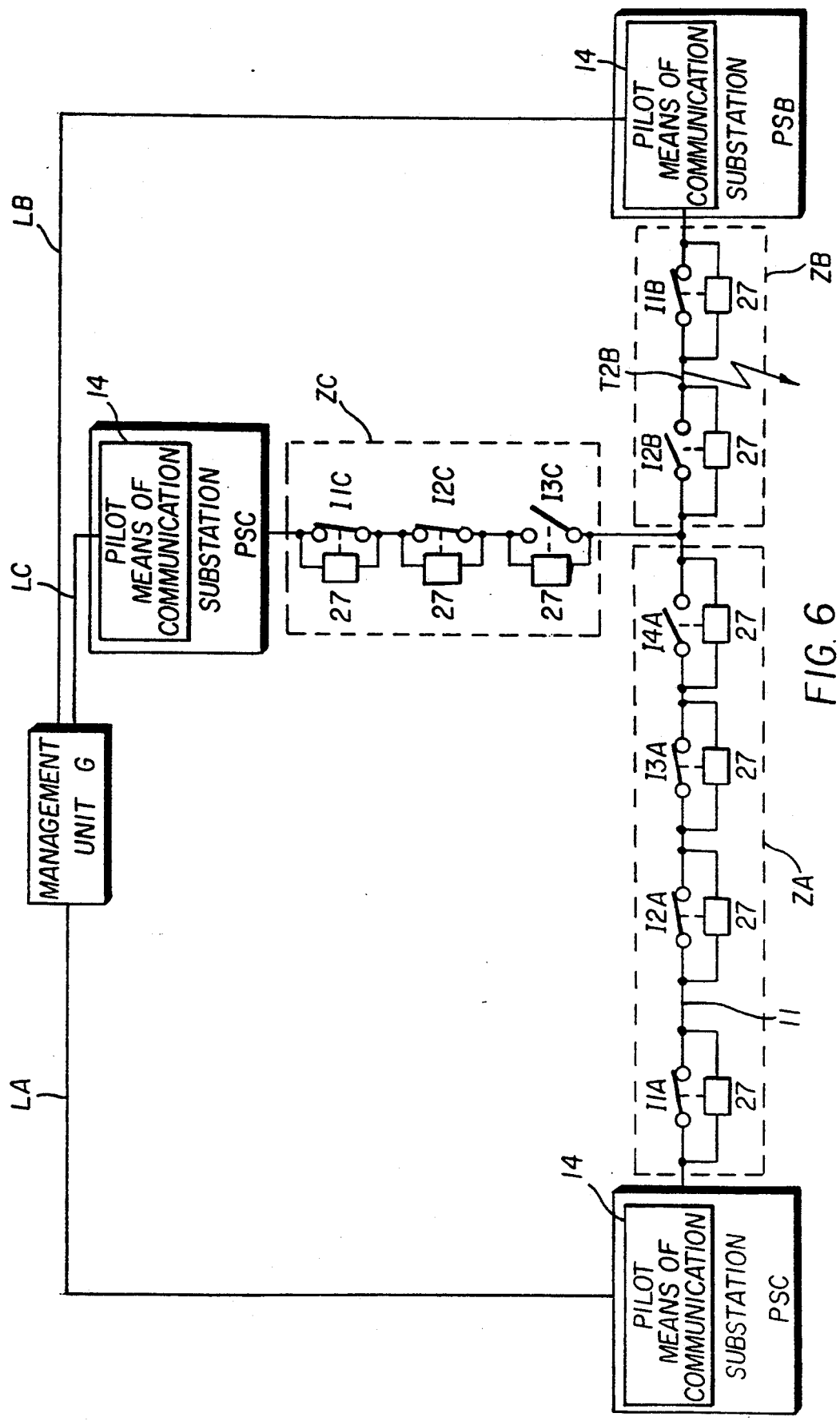
FIG. 6 is a view of the remote transmission device with the communication zones in normal operating conditions before a fault occurs.

Referring to FIG. 6, the transmission device 10 is broken down into a plurality of disunited sub-systems containing only a single source substation PSA,PSB,PSC... Under normal operating conditions, i.e. with no incident on the power distribution system MT, each source substation PSA,PSB,PSC is respectively assigned a communication zone ZA,ZB,ZC containing the source substation PSA,PSB,PSC involved, and whose boundaries are formed by the open switches I4A and I3C. In zone ZA, the pilot means of communication 14 of source substation PSA is master, and communicates with the fourth slave means of communication 27 associated with the switches I1A,I2A,I3A,I4A.

In zone ZB, the pilot means of communication 14 of source substation PSB is master, and communicates with the fourth slave means of communication 27 associated with the switches I1B,I2B.

The same is the case in zone ZC in which the fourth slave means of communication 27 of the switches I1C,I2C,I3C communicate with the master means of communication 14 of source substation PSC.

In FIG. 6, let us assume that:

the means of communication 27 of zone ZA receive code A with priority 1, code B with priority 2, and code C with priority 3;

the means of communication 27 of zone ZB receive code B with priority 1, code A with priority 2, and code C with priority 3;

the means of communication 27 of zone ZC receive code C with priority 1, code B with priority 2, and code A with priority 3.

Switch I4A is open and is in dual coupling by receipt of codes A and B. After contact 36 has closed and contact 37 has opened, the electronic circuit 34 of the associated means of communication 27 receives and transmits to the pilot means of communication 14 of source substation PSA.

Switch I3C is open and is also in dual coupling by receipt of codes C and B. The electronic circuit 34 and its means of communication 27 receives and transmits to the pilot means of communication 14 of source substation PSC.

Should a fault occur on the main line 11, the transmission device 10 comprising the lines of the power system MT as communication support has the shortcoming of interrupting the connection between the transmitter of certain pilot means of communication 14 and the receivers of the fourth means of communication 27 located downline from the fault.

Figure 7:
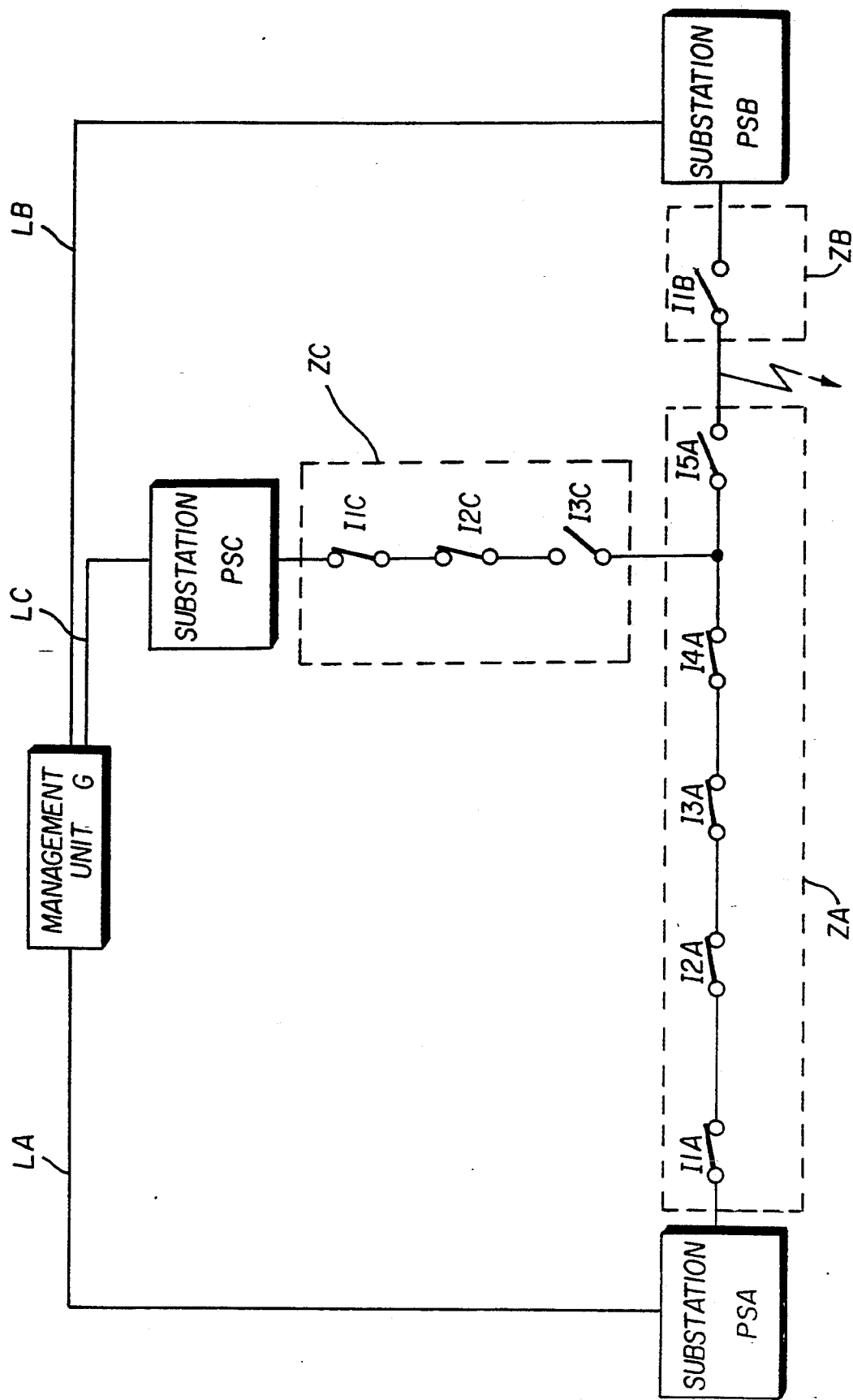
FIG. 7 represents the power system MT of FIG. 6 reconfigured after a fault.

Should a fault occur on the section T2B of the main line 11, we will assume that the presence of this fault allows transmission of the coded signals before the fault but prevents transmission beyond it, i.e. the means of communication 27 of switch I2B can receive and transmit to source substation PSA or PSC, but that of switch I1B cannot receive the coded signals from source substations PSA and PSC. The same is true for the means of communication 27 of switch I2B, and of all the switches of zones ZA and ZC which cannot receive the coded signal B from the source substation PSB. In particular, the means of communication 27 of switches I4A and I3C which were previously in dual coupling state now only receive codes A and C respectively. The means of communication 27 of switch I4A then switches to by-pass coupling after a preset time, resulting in closing of the contacts 36 and 37 to enable the means of communication 27 of switch I5A (formerly I2B) to be controlled by source substation PSA (FIG. 7). The means of communication 27 of switch I5A is in by-pass state, since it only receives code A. It can be noted that the new zone ZA is then enlarged so as to cover I2B (which becomes I5A), whereas the new zone ZB is reduced.

After this modification of the transmission device 10, the reconfiguration operations of the power system MT as represented in FIG. 7 can be performed by means of the control unit 43 of the switches involved (I5A and I4A).

Should the fault be cleared, the means of communication 27 of switch I5A switches from by-pass state to dual coupling state in a predetermined time, with receipt of the highest priority code B. The transmission device 10 then reverts to the configuration in FIG. 6.

It is clear that the switching system 36,37,38,39 of the modem 30 can be achieved with equivalent means.

The coupling unit modems use phase modulation with spectral spread by direct sequence with transposition on a single 25 kHz carrier frequency. The whole 10-40 kHz band is used, and the choice of several spread codes enables several communication zones ZA,ZB,ZC to be defined. This technique provides the following advantages :
single carrier frequency,
minimized radiation energy,
increased signal/noise ratio,
frequency band optimization.

We claim:

1. A remote transmission device designed for automation of an electrical power distribution system, notably medium voltage, comprising means of communication by on-line carrier currents using by capacitive coupling lines of the power system as transmission support for exchange of information and orders between a computerized remote control system and a plurality of breaking devices, notably remote-controlled switches and circuit breakers located along a plurality of elementary sections of the power system to perform a modification in a structure of the power system affected by an incident, by means of opening and closing operations of the breaking devices involved, the power system being interconnected to source substations controlled by the computerized remote control system by means of specific connections, wherein:

the transmission device is broken down under normal operating conditions into several disunited sub-systems each containing a source substation, which has assigned to it a communication zone, whose boundaries are formed by line switches in the open state;

each source substation comprises a pilot means of communication having a master modulation and demodulation circuit designed to receive and send a coded signal within a predetermined communication zone;

each line switch is equipped with an auxiliary means of communication having a slave modulation and demodulation circuit designed to send and receive the coded signals with an order of priority, by means of a first receiver connected to a downline coupler connected to one of the terminals of said switch, a second receiver connected to an upline coupler connected to the opposite terminal of the same switch, and a transmitter connected to a coupling circuit;

said coupling circuit is either in a first shunt or by-pass state when the associated switch is closed, or on receipt of a single coded signal by the first or second receiver, or in a second dual coupling state, when the switch is open, and when two coded signals are received, so as to automatically reconfigure the communication zones on a faulty line, enabling optimum communication of the transmission device to be obtained before the structure of the power system is modified.

2. The remote transmission device according to claim 1, wherein the coupling circuit of each auxiliary means of communication comprises a switching system connected respectively to the output of each downline and upline coupler, and comprising a mid-point connected to the output of the transmitter, and said switching system is controlled by an electronic circuit of the slave modulation and demodulation circuit.

3. The remote transmission device according to claim 2, wherein the switching system comprises two contacts serially connected and actuated respectively by a first and a second relay supplied from the electronic circuit.

4. The remote transmission device according to claim 2 wherein the output signals from the first and second receivers of the modulation and demodulation circuit are processed by the electronic circuit associated with a code selector.

5. The remote transmission device according to claim 4, wherein a summing or switching circuit is connected between the electronic circuit and the outputs of the two receivers.

6. The remote transmission device according to claim 2,
wherein a position detector sends the electronic circuit a signal indicating the open or closed state of the line switch, and the electronic circuit is connected to the control unit of the switch by an electrical connection.

7. The remote transmission device according to claim 3, wherein the two contacts of the relays are closed in the first shunting state of the coupling circuit, whereas in the second dual coupling state, one of said contacts is closed and the other is open, the closed contact being located on the side of the source substation sending the code with higher priority, or of higher level.

8. The remote transmission device according to claim 1,
wherein the computerized remote control system cooperates with a management unit connected to the pilot means of communication of each source substation by the connections, to perform management of priorities between the applications, routing of information to the pilot means of communication of the source substations involved, and management of faults and performances of the electrical power distribution system.

9. The remote transmission device according to claim 1,
wherein each means of communication uses a spectral spread phase modulation with direct sequence for transmission on the power system lines.

10. The remote transmission device according to claim 3, wherein the output signals from the first and second receivers of the modulation and demodulation circuit are processed by the electronic circuit associated with a code selector.

* * * * *